3 Sheets—Sheet 1.

H. H. BARKER & G. EDMONSTON.
Alarms for Telephone-Lines.

No. 225,321. Patented Mar. 9, 1880.

Witnesses:
J. P. Th. Lang.
J. Russell Barr

Inventors:
Howard H Barker
Gabriel Edmonston
by Mason Fenwick & Lawrence
Attys

3 Sheets—Sheet 2.
H. H. BARKER & G. EDMONSTON.
Alarms for Telephone-Lines.
No. 225,321. Patented Mar. 9, 1880.
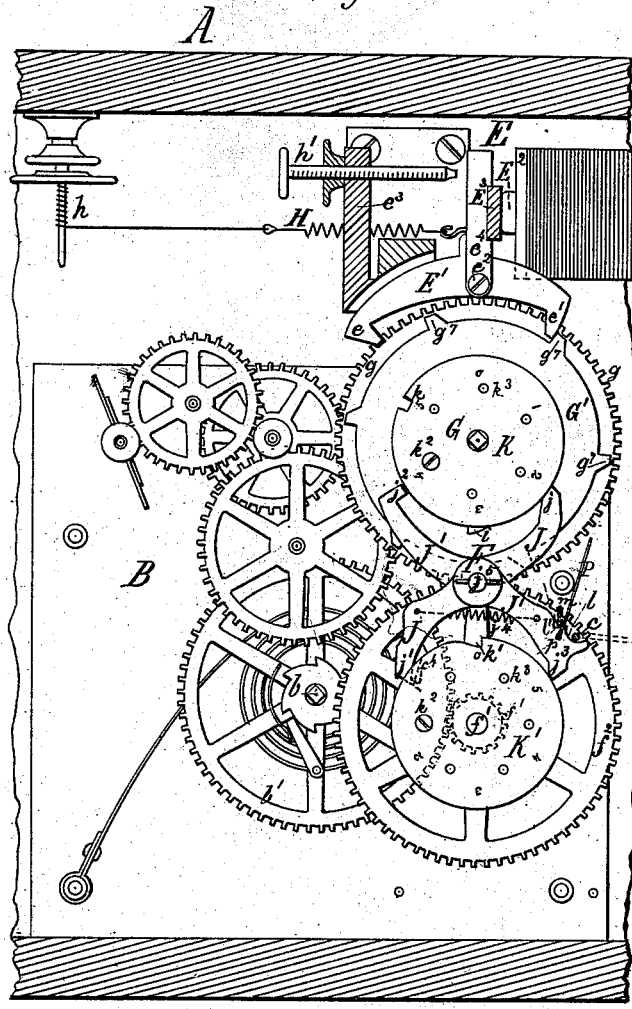
Fig 2.
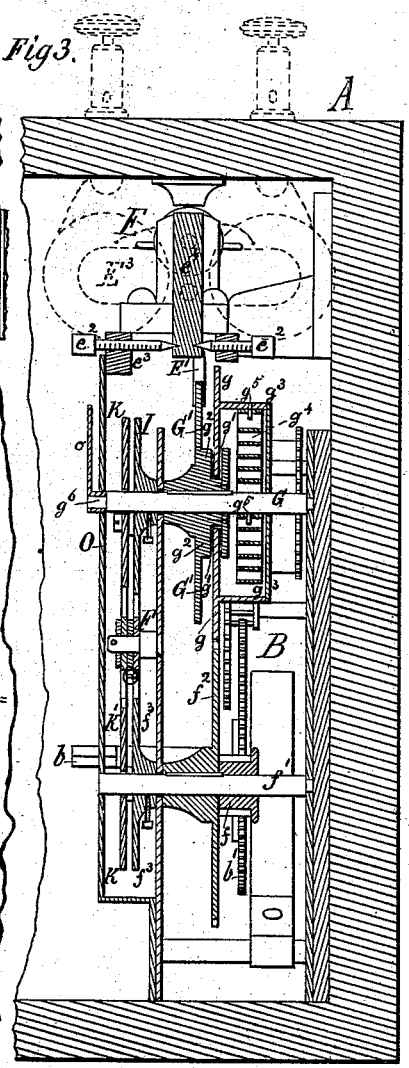
Fig 3.
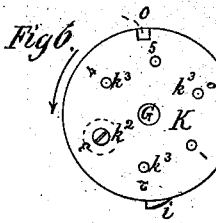
Fig 6. No 2.
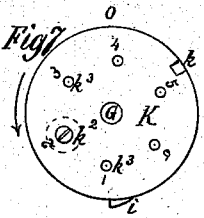
Fig 7. No 3.
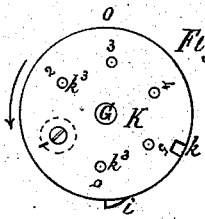
Fig 8. No 4.
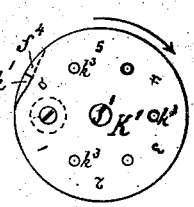
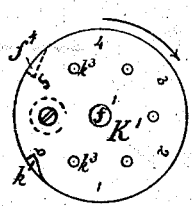
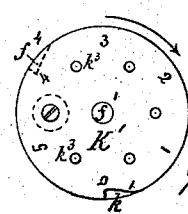
Witnesses:
J. P. Th. Lang.
J. Russell Bart
Inventors:
Howard H. Barker
Gabriel Edmonston
by
Mason Fenwick Lawrence
Attys.

3 Sheets—Sheet 3.

H. H. BARKER & G. EDMONSTON.
Alarms for Telephone-Lines.

No. 225,321. Patented Mar. 9, 1880.

Witnesses:
J. P. Th. Lang.
J. Russell Bart

Inventors:
Howard H. Barker
Gabriel Edmonston
by Mason Fenwick & Lawrence
Attys

UNITED STATES PATENT OFFICE.

HOWARD H. BARKER AND GABRIEL EDMONSTON, OF WASHINGTON, D. C.

ALARM FOR TELEPHONE-LINES.

SPECIFICATION forming part of Letters Patent No. 225,321, dated March 9, 1880.

Application filed December 27, 1879.

*To all whom it may concern:*

Be it known that we, HOWARD H. BARKER and GABRIEL EDMONSTON, of Washington, in the county of Washington and District of Columbia, have invented a new and Improved Alarm for Telephones and other Instruments adapted for Communicating Messages through Magnetic Appliances; and we do hereby declare that the following is a full, clear, and exact description of the same, reference being had to the accompanying drawings, forming a part of this specification, in which—

Figure 1:
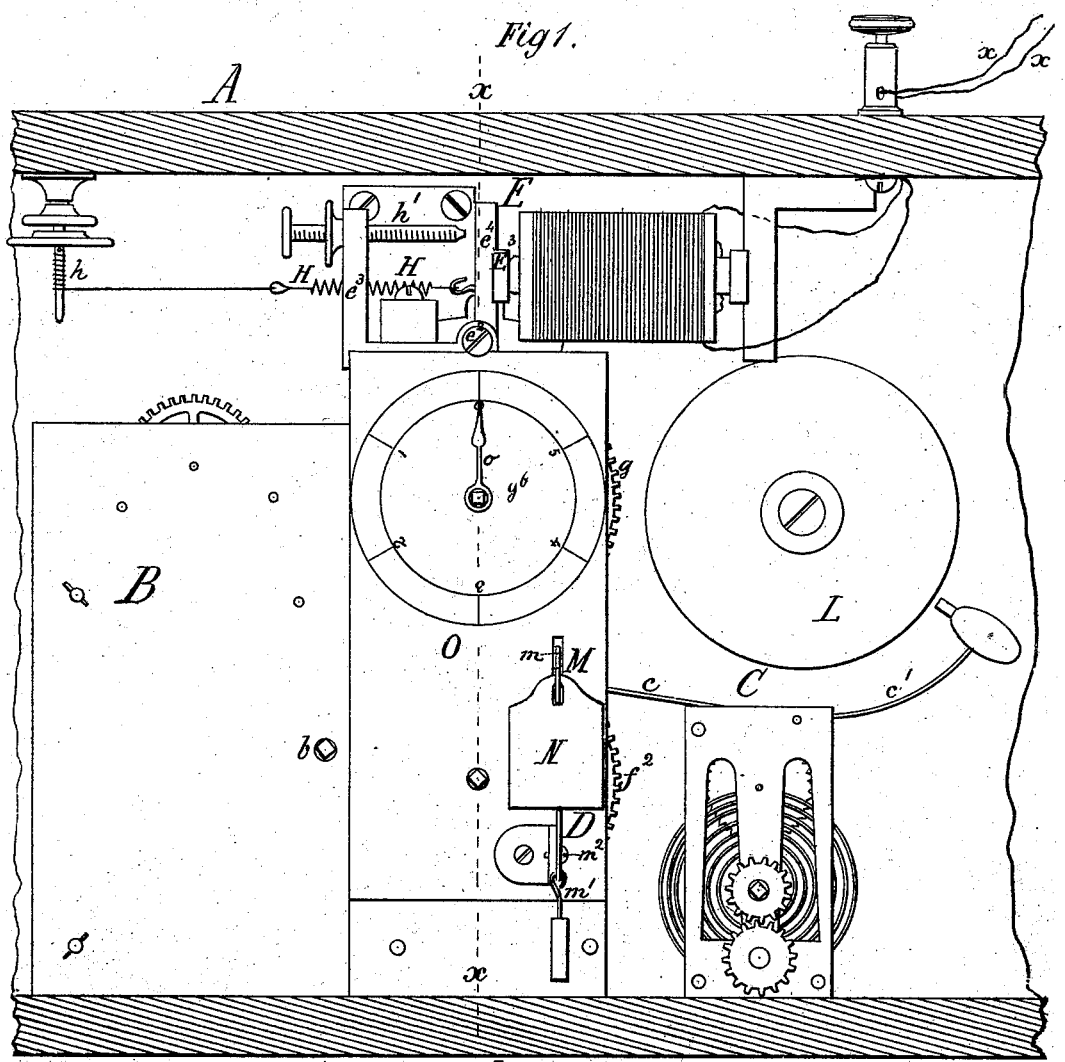
Figure 4:
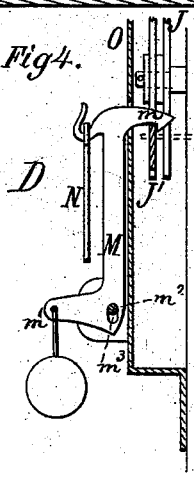
Figure 5:
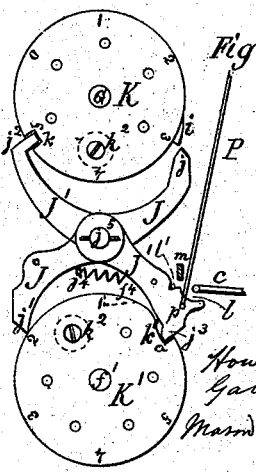
Figure 9:
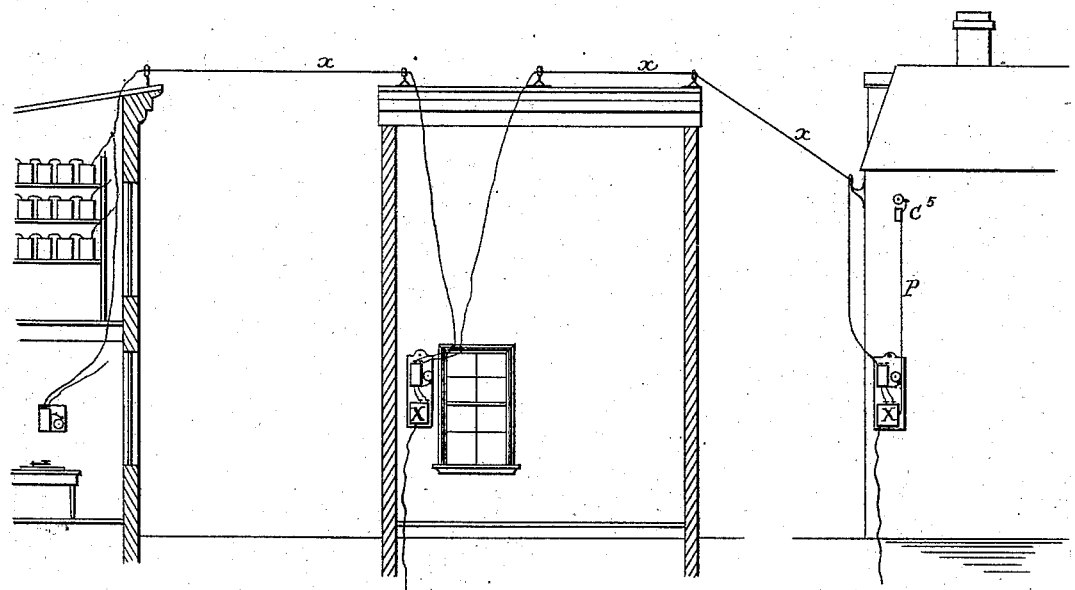
Figure 10:
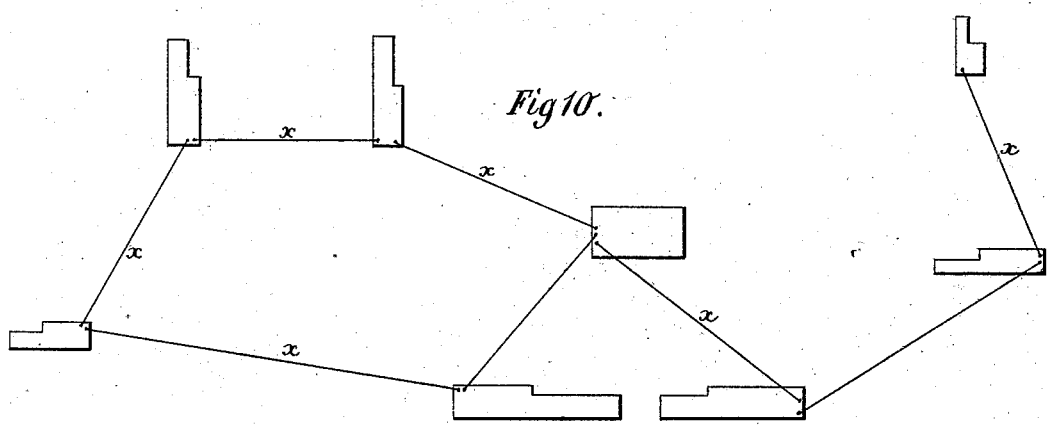
Figure 11:

Figure 1 is a front elevation of the improved alarm, this view illustrating one well-known means for forming a magnetic connection between the alarm and a telephone or other magnetic signaling apparatus. Fig. 2 is a front elevation and partial section of the alarm apparatus, a portion of the supporting-frame for the shafts of the gear-wheels and other mechanism having been removed, together with the annunciator. Fig. 3 is a vertical section in the line $x\ x$ of Fig. 1, the parts removed in Fig. 2 having been replaced. In this view the magnetic connections are represented by dotted lines, which they would occupy forward of the gearing. Fig. 4 is a detail section, showing the annunciator and parts of the mechanism for operating it. Fig. 5 is a detail view of the two controlling-disks and their levers in the position they occupy when the alarm and annunciator are set free. Figs. 6, 7, and 8 are diagrams representing the disks as arranged in different machines according to the numbers of the machines—viz., 1, 2, 3, and so on. Fig. 9 is a diagram of a central or station office and two private buildings having telephonic connection, the private buildings being provided, respectively, with the usual telephone and our improved alarm and annunciator. Fig. 10 is a plan diagram, showing the wire-connection between the central or station office and houses provided with telephones and our alarm and annunciator apparatus. Fig. 11 is an edge view of the disks.

In the use of our invention the manipulation of the magnetic appliances at the central or station office will be about as follows: In calling upon telephone No. 1 the armature must be oscillated once; telephone No. 2, twice; telephone No. 3, three times; telephone No. 4, four times, and telephone No. 5 five times. In calling telephone No. 2 the armature must be oscillated rapidly enough to prevent a register between alarm-tripping mechanism of telephone No. 1 and the upper disk thereof; and this is so in calling telephones 3, 4, and 5. This is the case, because the notches of the alarm of telephone No. 1 must pass by the toes of the tripping and stopping levers during the passage of the notches of the alarm of telephone No. 2 to a position which will register them with said levers, and so on in the passage of the notches of the alarms of telephones Nos. 3, 4, and 5 to their registering positions; and when a machine is called and an alarm is to be sounded the clock-train is set free, and the central-office operator waits a few seconds, after oscillating the armature, for said movement to move the lower disk around and sound the alarm.

Our invention relates especially to alarms and annunciators operated by magnetic mechanism; but certain parts of the machinery which we employ will be found useful, whether operated by magnetic mechanism or by hand, or by other means.

The object of our invention is to overcome the serious inconvenience and annoyance arising from the sounding of the several alarms of a series of telephones or other magnetic signaling apparatus which are on the same circuit-wire, or on circuit-wires which are worked from the same station-office, and also indicate by a pointer which machine is in use.

Another object is to operate the alarm of each telephone or other signaling apparatus separately, and at the same time and by the same means operate an annunciator and have the same announce to the owner of the telephone that his machine has been called while he was absent from the room in which the machine is situated.

Another object is to operate a series of alarms belonging to a single telephone, fire-alarm telegraph, or other magnetic apparatus for communicating by sounds between different locations by the one main-alarm mechanism, and at the same time have the respective main-alarm mechanisms of a series of telephones on the same circuit-wires sounded independently of one another.

Our invention consists, first, in means whereby several telephones, fire-signaling, or other analogous magnetic machines are adapted to be worked on the same circuit-wires or different circuits in communication at the station-office, and while thus worked the respective alarms of the respective machines will be sounded separately or independently—that is, when the alarm of telephone No. 1, for instance, is sounded, the alarms of telephones Nos. 2, 3, 4, and 5 will not be sounded, and so when either of the others is sounded No. 1 will not be sounded, nor will any other than the one called be sounded.

It consists, second, in providing an alarm mechanism for telephones, fire-alarm telegraphs, and other signaling apparatus, which, by a simple change in the relative position of certain notches and a tooth of two oppositely-revolving disks, or equivalents thereof, to the starting or zero mark of a dial, can be adapted for sounding an alarm by either a single oscillation of a magnetic armature, or by two, three, four, or five oscillations of such armature, and thus a plurality of magnetic machines having each a magnetic alarm of like construction, except that the notches and tooth above mentioned of each alarm are at different distances from the starting or zero mark of the dial, can be operated on the same circuit or different circuit wires in communication at the station-office, and the respective magnetic machines sounded independently of one another—that is, when the alarm of one magnetic machine is sounded the alarms of the other machines will not be sounded.

It consists, third, in the combination of a verge, a verge-wheel having three or more escapement-teeth, a notched and toothed disk carrying a pointer which moves opposite a dial-plate, an alarm-tripping and power-stopping disk, an alarm retaining and releasing lever, and a lever stop-pawl, as will be hereinafter described.

It consists, fourth, in a magnet, armature, verge-wheel having three or more escapement-teeth, and a spring for operating the verge-wheel, in combination with a notched and toothed disk carrying a dial-pointer which moves with the verge-wheel and disk, an alarm-tripping and power-stopping disk, an alarm retaining and releasing lever, and a lever stop-pawl, the combination being such that when the armature of a magnetic alarm numbered 1 is oscillated once by the electric current of a circuit-wire the verge will be oscillated once and the verge-wheel released and allowed to move around a distance equal to the space between two of its teeth, and this movement will cause the upper disk to move an equal distance and carry its pointer with it, and also to bring its notch in proper position for receiving the upper end of the alarm-releasing lever and causing its tooth to raise the lever stop-pawl out of the stop-notch of the lower disk; and when this is effected the lower disk is caused to move around, and during its movement the lower end of the alarm-releasing lever is caused to fall into the tripping-notch and its upper end into the notch of the upper disk, whereupon the alarm and an annunciator are set free and allowed to perform their offices, the lower disk continuing its movement until arrested by the lever stop-pawl; and now, by oscillating the armature by the magnetic current from the station-office, the upper disk, its pointer, notch, and tooth and verge-wheel are caused to occupy their original or starting positions with respect to the zero-mark of the dial.

It consists, fifth, in the combination of a magnet, an auxiliary mechanism controlled by a verge for moving an upper disk, a main clock mechanism for moving a lower disk, two levers, and an alarm mechanism, whereby the alarm is sounded and the movements of the two mechanisms stopped, the auxiliary mechanism being stopped before the alarm is sounded, and the main mechanism after the alarm is sounded.

It consists, sixth, in the combination of a magnet, an auxiliary mechanism by which the upper disk is moved and arrested, a main mechanism by which the lower disk is moved, a lever by which the alarm, or an alarm and an annunciator, are set free and allowed to perform their offices, and a lever by which the lower disk is arrested after the alarm is sounded and the annunciator allowed to fall down, the combination being such that the upper disk can be turned around to its starting or zero mark of a dial independently of the lower disk and its mechanism.

It consists, seventh, in the combination of the main clock mechanism for moving the lower disk, the mechanism for starting and stopping this disk, and the auxiliary mechanism for moving the drum of the spring which moves the upper disk, the combination being such that the spring for operating the verge-wheel, upper disk, and its pointer is wound up by the main clock-movement while the lower disk is being moved, and that the forces employed for moving the two disks can be exerted to move the disks in opposite directions.

It consists, eighth, in the combination of the two disks revolved in opposite directions by independent forces, a verge and verge-wheel, and a mechanism for starting the lower disk, releasing an alarm, and stopping said disk.

It consists, ninth, in a novel manner of combining an annunciator-plate, a slotted angular lever which is weighted at one end and provided with a latch at the other with the upper and lower disks, the levers for controlling the disks, and an alarm mechanism, as hereinafter described.

It consists, tenth, in the combination of two or more mechanical alarm contrivances similar to one another, arranged on the same electric circuit and adapted for sounding an alarm independently of one another in accordance with the variant numbers of pulsations of the electric current and the vibrations of the armatures, each of said contrivances comprising upper and lower revolving disks impelled by clock mechanisms and set in motion by electric pulsations, and also having locking and releasing levers, all as hereinafter described.

It consists, eleventh, in having the disks herein described formed each of two plates screwed together and numbered 1, 2, and upward, and provided with screw or pin holes corresponding with the numbers, whereby, when two or more telephones, fire-alarms, or other analogous magnetic machines are used on the same electric-circuit wires, the machine No. 1 may be set to have its alarm sounded only when its number is called, and the other respective machines set to have their respective alarms sounded only when their respective numbers are called. This construction of the disks also facilitates the setting up of the alarms in different houses or places, as all of the machines may be manufactured exact duplicates of one another, and by setting the numbers on the disks around at different places to correspond with the number of the telephone or fire-alarm all of the machines will sound alarms on different numbers, or in accordance with the proper number of the telephone or other apparatus.

In the accompanying drawings, A represents a suitable box in which is placed the alarm mechanism. The alarm mechanism shown comprises a clock-train, B, hung in a suitable frame and operated by a spring or other power, a gong-alarm, C, an annunciator, D, a magnetic escapement, E, and a controller, F.

The clock-train B is of ordinary construction, and the winding-arbor $b$ of its spring is made accessible through the box A, so that it may be wound up without opening the box. One of the wheels, $b'$, of the train gears into a wheel, $f$, upon an arbor, $f'$, of the clock-frame. Upon this arbor a wheel, $f^2$, and a disk, $f^3$, are fastened. The wheel $f^2$ gears into a twin wheel, $g$, upon an arbor, G, hung in the clock-frame. This wheel $g$ is hung in a groove, $g'$, formed in the hub $g^2$ of a verge-wheel, G', and it has freedom to revolve in said groove and around the arbor G, while the verge-wheel is fastened to said arbor. The wheel G' is provided with a suitable housing, $g^3$, in form of a drum, in which a clock-spring, $g^4$, is secured by means of pins or screws $g^5$, one end being hooked to the housing $g^3$ and the other end to the arbor G.

In order to give the spring $g^4$ its appropriate tension the arbor G is provided with a square head, $g^6$, whereby it may be wound up to the proper degree for starting by the manufacturer or owner.

The wheel $g$ cannot be turned around by the spring $g^4$, because it gears into the wheel $f^2$, and the verge-wheel G' is prevented from being turned around by the spring $g^4$ by reason of a number of ratchet or escapement teeth, $g^7$, being formed on its periphery, and said teeth being checked alternately by the teeth $e\ e'$ of a verge-lever, E'.

The teeth $e\ e'$ are formed like ratchet-teeth, and allow the teeth $g^7$ of the verge-wheel G' to pass by them when the spring $g^4$ is wound up by hand.

The verge-lever E' is hung between the points of two fulcrum-screws, $e^2$, in a suitable stand, $e^3$, secured to the box A. The teeth $e\ e'$ are so arranged upon their lever E' that only one of them at a time can check the verge-wheel G', and thus it takes two movements or one oscillation of the verge-lever to allow one tooth $g^7$ to pass the verge lever entirely. These oscillations are effected successively by means of a magnet, $E^2$, fastened to the box A, and operated by electricity, and an armature, $E^3$, fastened to an upright arm, $e^4$, of the verge-lever E'.

A tension-spring, H, suitably hooked to the arm $e^4$ and fastened to a suitable tension-post, $h$, moves the arm $e^4$ back against an abutment-screw, $h'$, in the stand $e^3$ whenever the magnet releases the armature $E^3$.

The arbor G is provided with a disk, I, in line with the disk $f^3$, and this disk I is provided with a projection, $i$, by which the upper end, $j$, of a lever, J, is operated whenever the disk I is revolved to a certain extent.

The lever J is hung upon a fulcrum, $j^5$, on the clock-frame, and with its lower end, $j'$, occupies a notch, $f^4$, in the disk $f^3$, and thus stops the clock-train.

By the projection $i$ passing the upper end of the lever and moving it off the disk the lower end, $j'$, is moved out of the notch $f^4$ of the lower disk and the clock-train is started.

To the disk I another disk, K, is fastened, and to the disk $f^3$ a disk, K'. The disk K is provided with a notch, $k$, and the disk K' with a notch, $k'$.

A lever, J', hung on the fulcrum $j^5$, and provided with a suitable toe, $j^2$, on its upper end and a toe, $j^3$, on its lower end, is made to fall into these notches $k\ k'$ whenever they coincide with the toes of the lever.

Both levers are connected by a tension-spring, $j^4$, which draws the levers together against the peripheries of the disks or into their respective notches, as the case may be.

The lower arm of the lever J' is provided with a suitable abutment, $l$, for the free end $c$ of an alarm-lever to rest against, and be held at rest during the time which the toes $j^2$ $j^3$ of the lever J' bear against the peripheries of the disks, but from which the said lever is set free and allowed to sound an alarm-gong, L, when the toes of the lever enter the notches $k\ k'$.

A horizontal step, $l'$, is formed on the lever J', and into this step a latch-hook, $m$, of a vertical lever, M, falls.

To the lever M an annunciator-tablet, N, is hung, and a weighted horizontal arm, $m'$, applied.

The weighted arm facilitates the descent of the lever when the hook $m$ is set free from the step $l'$, which takes place as soon as the lever $J'$ enters the notches $k$ $k'$.

In order to re-engage the hook $m$ with the lever M while said lever is in its normal position, the lever is made adjustable at its pivotal connection or fulcrum $m^2$ in a vertical slot, $m^3$, and by lifting the lever M to the extent of its slot $m^3$ the hook becomes sufficiently elevated to slide over the edge of the lever $J'$ and latch the lever M thereto.

A hole or holes are provided in the lever $J'$ at $p$, and an additional alarm wire or wires, P, passed through the same and fastened to the lever. By means of these wires alarms arranged in different rooms of the house can be sounded simultaneously with the sounding of the alarm which is in the room with the telephone.

In Fig. 9 of the drawings the wire P is shown extended from one story to another of a house and connected with an auxiliary alarm, $C^5$.

The disks K K' are fitted loosely upon their arbors, and fastened, by means of set-screws $k^2$, to the disks $f^3$ and I, respectively, which latter are made fast to their arbors by set-screws, and they are provided with holes $k^3$, arranged in a circle and at equal distances from each other. The number of these holes $k^3$ is the same as the number of teeth $g^7$ on the verge-wheel G', and by means of said holes the disks K K' can be fastened, respectively, to the disks $f^3$ I in different positions, as illustrated in Figs. 6, 7, and 8. The disks being numbered 1, 2, 3, 4, 5, and upward, the notches and tooth of the disks are adjusted with respect to such numbers, said numbers, when coinciding with the notches, answering, respectively, to the numbers of the machines to which the disks belong. The object in setting the notches and the tooth at different points on the circle is to have the alarms sounded separately at the different houses on the circuit or circuit-wires—as, for instance, in Fig. 6, the disks are shown in such position as to cause the alarm to be sounded at No. 2; in Fig. 7, to be sounded at No. 3; in Fig. 8, at No. 4, and so on, according to the number of machines in use, and while one alarm is being sounded none of the others are sounded, except the auxiliary alarms of the respective telephones, which are only sounded along with the alarm of the telephone which is called by its number.

The same independent sounding of the alarms can be effected by employing disks answering to those, K I and K' $f^3$, not cast in two parts, respectively; but in such case it will be necessary to set the notches of the disks of the different machines at different points with respect to the starting or zero mark of a dial-plate and the number of the machine to which they are to be applied—that is to say, the notches for machine No. 1 will have to be nearer zero-mark than those of machine No. 2, and so on.

The arbor G is provided with a pointer, $o$, which indicates upon a numbered dial-plate, O, of the clock-frame the position of the verge-wheel and disk K'. This dial-plate and pointer are to be suitably exposed to the eye of the patron of the telephone company, and protected by a glass plate, and by this means the patron is enabled to know whenever the circuit-wire is in use by another telephone, and he will not use his telephone until the pointer stands at zero, to which point it, with the pointers of all the telephones on the circuit, is brought by the manipulations of magnetic means in the station or central office.

The application of our invention to the telephonic system now in use requires but slight change in the telephones and mode of operating them. This consists in the removal of the ordinary alarm and in connecting the telephone wire or wires with the magnet-coils of our machine, which latter may be placed below the telephone, as shown at X in Fig. 9, or at any suitable place in the building.

The service-wires $x$ will remain undisturbed and the telephones will be controlled by the well-known magnetic appliances connected with the improved alarm when the operator at the central or station office desires to speak through them. The central or station office will be provided with a key-board for breaking and closing the electric circuit in order to operate the magnet and verge of our improved alarm mechanism and indicate the calls, and also to set the pointers of all the machines at the starting or zero mark after the use of the circuit by any one of the telephones.

The operation, in brief, is thus: If patron No. 4 wants to communicate with patron No. 2 he makes known his desire at the station-office through his telephone in the usual manner. The clerk of the station-office, by means of the key-board, with two movements sets the machines of all the patrons in operation, and causes the disks K and the pointers $o$ to move and stand at 2 of the dials O. The disks K' and the clock-trains are all set free by the tooth or projection $i$ and the levers J as soon as the pointers $o$ arrive at 1 of the dials and the said disks make one revolution. In machine No. 2 the slot $k$ stands now opposite the toe $j^2$ of the lever J', as illustrated in Fig. 5, and during the revolution of the disk K' its notch $k'$ arrives opposite the toe $j^3$ of the lever J, as illustrated in Fig. 5. At this coincidence the lever is moved by the spring $j^4$ into the said notches of the machine No. 2, and its alarm and annunciator are set free while the disk K' is revolving. The notch $k'$, having set free the alarm and annunciator, passes beyond the toe $j^3$ of lever J', and said toe is caused to travel upon the higher portion of the circumference of the disk K', and by this means the toe $j^2$ of said lever J' is moved out of the notch $k$ of the disk K, thus leaving disk K free to be moved around again to zero by the escapement. The disk K' of machine No. 2 and of all the others are arrested at the completion of their respective revolutions by the toes $j$ of the levers J falling into the notches $f^4$ of disks $f^3$. No other alarm on the circuit or connected circuits is sounded, because the levers and notches are not allowed time to coincide while machine No. 2 is being operated to sound an alarm where it is located. The manipulations of the key-board for breaking and closing the connection with the magnets control the coincidence of the levers with the respective machines during a call from one telephone for another at the central or station office.

After the usual answer from patron No. 2 to the station-office the communication between patrons No. 4 and 2 are carried on until the alloted time has expired, or until patron No. 4 reports to the office "O. K.," whereupon the clerk of the office makes the required movement upon his key-board to bring all the machines back to their normal position, in which their pointers $o$ stand at zero. At the same time the alarm is sounded the annunciator of the same machine drops and remains in that condition until the patron puts it in its normal position by hand. The fallen position of the annunciator serves to inform a patron that a call has been made on his telephone.

By our invention the several patrons of a telephonic circuit or circuits connected to line-wires and a station-office are enabled at a glance to see from the dials of their machines whether the circuit is in use, or if it is ready for use, and they can also see by a glance at the annunciator, whether they been have called while absent; and, besides this, the alarm of every machine is sounded independently, and persons in one house are not disturbed every time an alarm is sounded in another.

During the revolution of the lower disk, K', the spring-power of the upper disk, K, is wound up by the power of the clock-train, this being effected by gearing the spring-drum of the upper disk to the arbor $f'$ of the lower disk, as hereinbefore described, and thereby allowing the upper disk and its pointer to be revolved, with their arbor G, in one direction by the action of the spring $g^4$ when the verge-wheel is set free by the oscillations of the verge and armature, and the drum to be revolved in the same direction by the clock-train when the lower disk begins to revolve in an opposite direction to that in which the upper disk is revolved; and when the clock-train is stopped, or while it is in motion, the upper disk and pointer can be farther revolved in the same direction by the thus accumulated power of the spring $g^4$ when the magnetic current is oscillating the armature and verge, and thereby allowing the verge-wheel to pass around. This is a very important result, as it dispenses with a separate clock mechanism for controlling the spring $g^4$. Such separate mechanism, however, might be used without departing from the principle involved in our alarm mechanism for preventing the sounding of all the alarms of a circuit of machines when a call is made through the telephonic system upon any one of the machines.

What we claim is—

1. The disk K, with its notch $k$, and the disk I, with its tooth or projection $i$, or the equivalent thereof, substantially as and for the purpose described.

2. The combination of the disks K K' and I $f^3$ and the levers J J', substantially as and for the purpose described.

3. The combination of a verge, E', verge-wheel G', having three or more escapement-teeth, $g^7$, a notched and toothed disk, K, an alarm tripping and arresting and power-stopping disk, K', an alarm retaining and releasing lever, J', and a lever stop-pawl, J, substantially as and for the purpose described.

4. The combination of a magnet, $E^2$, armature $E^3$, verge-wheel G', having three or more teeth, $g^7$, spring $g^4$, for operating the verge-wheel, disk K, pointer $o$, levers J and J', and disk K', substantially as and for the purpose described.

5. The combination of a magnet, an auxiliary mechanism controlled by a verge, E', for moving an upper disk, K, a main clock mechanism, B, for moving a lower disk, K', levers J and J', and an alarm mechanism, C, substantially as and for the purpose described.

6. The combination of a magnet, an auxiliary mechanism by which the disk K is moved and arrested, a main mechanism by which the disk K' is moved, a lever by which the alarm, or both the alarm and an annunciator, are set free, and a lever by which the lower disk is arrested, whereby the upper disk, K, can be turned around to the starting or zero mark of a dial independently of the disk K', substantially as and for the purpose described.

7. The combination of the main clock mechanism for moving the lower disk, K', the mechanism for starting and stopping this disk, and the auxiliary mechanism for moving the drum of the spring $g^4$, whereby the power of the clock-movement is employed for winding up the spring $g^4$, which moves disk K, substantially as described.

8. The combination of the disks K K', revolved in opposite directions by independent forces, a verge, E', verge-wheel G', and a mechanism for starting the lower disk, K', releasing and stopping an alarm, and stopping said disk, substantially as described.

9. The combination of the annunciator-plate N, slotted angular lever M, having a latch, $m$, and weighted arm $m'$, the upper and lower disks, K I K' $f^3$, and an alarm mechanism, C, substantially as and for the purpose described.

10. The combination of two or more mechanical alarm contrivances similar to one another, arranged on the same electric circuit, and adapted for sounding an alarm independently of one another, in accordance with the variant numbers of pulsations of the electric current and vibrations of the armatures, each of said contrivances comprising upper and lower revolving disks impelled by clock mechanisms and set in motion by electric pulsations, and also having locking and releasing levers which are operated in the different alarm contrivances at different distances from the zero-mark of the dials, substantially as and for the purpose described.

11. The disks K I and K' $f^3$, numbered, provided with holes, and screwed or pinned together, substantially as and for the purpose described.

HOWARD H. BARKER.
GABRIEL EDMONSTON.

Witnesses:
J. F. MUNSON,
J. P. THEODORE LANG.